(12) United States Patent
Cree et al.

(10) Patent No.: US 8,445,786 B2
(45) Date of Patent: May 21, 2013

(54) CROSSLINKABLE BLENDS OF POLYOLEFIN ELASTOMERS AND SILANE COPOLYMERS FOR INCREASED FLEXIBILITY CABLE INSULATION

(75) Inventors: Stephen H. Cree, Hirzel (CH); David P. Wright, Somerset, NJ (US)

(73) Assignee: Dow Global Technologies LLC, Midland, MI (US)

( * ) Notice: Subject to any disclaimer, the term of this patent is extended or adjusted under 35 U.S.C. 154(b) by 563 days.

(21) Appl. No.: 12/664,703

(22) PCT Filed: Jun. 20, 2008

(86) PCT No.: PCT/US2008/067672
§ 371 (c)(1),
(2), (4) Date: Dec. 15, 2009

(87) PCT Pub. No.: WO2009/002845
PCT Pub. Date: Dec. 31, 2008

(65) Prior Publication Data
US 2010/0181092 A1    Jul. 22, 2010

Related U.S. Application Data

(60) Provisional application No. 60/946,458, filed on Jun. 27, 2007.

(51) Int. Cl.
*H01B 7/00* (2006.01)
(52) U.S. Cl.
USPC .............. 174/110 R; 174/120 R; 174/120 SC
(58) Field of Classification Search
USPC ................ 174/110 R, 110 AR, 120 R, 120 C, 174/120 AR, 120 SR; 428/378, 391, 447
See application file for complete search history.

(56) References Cited

U.S. PATENT DOCUMENTS

| 3,225,018 | A |  | 12/1965 | Zutty |  |
|---|---|---|---|---|---|
| 3,646,155 | A |  | 2/1972 | Scott |  |
| 4,549,041 | A |  | 10/1985 | Shingo et al. |  |
| 4,574,133 | A |  | 3/1986 | Umpleby |  |
| 4,689,369 | A | * | 8/1987 | Ishino et al. | 525/288 |
| 5,272,236 | A |  | 12/1993 | Lai et al. |  |
| 5,492,760 | A | * | 2/1996 | Sarma et al. | 428/378 |
| 6,005,192 | A | * | 12/1999 | Mashikian et al. | 174/110 R |
| 6,299,978 | B1 | * | 10/2001 | Sarma | 428/379 |
| 6,331,597 | B1 |  | 12/2001 | Drumright et al. |  |
| 6,420,485 | B1 |  | 7/2002 | Suzuki et al. |  |
| 6,468,583 | B1 | * | 10/2002 | Jackson et al. | 427/117 |
| 6,667,098 | B1 | * | 12/2003 | Eklind et al. | 428/380 |
| 6,936,655 | B2 |  | 8/2005 | Borke et al. |  |
| 7,435,908 | B2 | * | 10/2008 | Jungkvist et al. | 174/110 R |
| 2003/0111253 | A1 | * | 6/2003 | Easter | 174/110 R |
| 2005/0049343 | A1 |  | 3/2005 | Borke et al. |  |
| 2007/0027250 | A1 |  | 2/2007 | Joseph et al. |  |

FOREIGN PATENT DOCUMENTS

| EP | 0 149 903 A2 | 7/1985 |
| EP | 0 256 246 A2 | 2/1988 |
| EP | 0 341 644 A1 | 11/1989 |
| EP | 0 365 289 A2 | 4/1990 |
| EP | 0 481 898 A2 | 4/1992 |
| GB | 2 156 825 A | 10/1985 |
| JP | 54 076648 A | 6/1979 |
| JP | 54 148044 A | 11/1979 |
| JP | 2000 351876 A | 12/2000 |
| WO | 91/08262 A2 | 6/1991 |

* cited by examiner

*Primary Examiner* — William Mayo, III
(74) *Attorney, Agent, or Firm* — Whyte Hirschboeck Dudek SC

(57) ABSTRACT

Compositions having at least 60 weight percent, based on the total weight of polymers, have at least one silane crosslinkable polyolefin resin and up to about 40 weight percent, based on the total weight of polymers, of at least one polyolefin elastomer resin, wherein the polyolefin polymer elastomer resin has density of less than or equal to about 0.89 g/cm$^3$ and a melt index, $I_2$, of less than about 50 g/10 mm. and which has been prepared using at least one metallocene catalyst provide improved flexibility, especially low temperature flexibility, while maintaining suitable cure performance and strength compared to the silane crosslinkable polymer resin alone. This composition may be used in cables for low temperature service applications.

19 Claims, No Drawings

CROSSLINKABLE BLENDS OF POLYOLEFIN ELASTOMERS AND SILANE COPOLYMERS FOR INCREASED FLEXIBILITY CABLE INSULATION

FIELD OF INVENTION

This invention generally relates to silane moisture curable polymer resin compositions and more particularly, to such compositions having increased low temperature flexibility.

BACKGROUND OF THE INVENTION

The majority of polyethylene insulated low voltage cables are cured or crosslinked by a moisture cure process whereby an alkoxy silane attached to the polyethylene chain is hydrolyzed and then cures under the influence of a suitable catalyst. The alkoxy silane may be attached to the polyethylene chain by two methods. Either vinyl trialkoxy silane is copolymerized with ethylene to yield a silane copolymer or the vinyl alkoxy silane is grafted onto the polyethylene, polymer backbone by peroxide initiated reactive extrusion.

In the former case the resulting copolymer is similar to LDPE and is a semi-rigid insulation material (flexural modulus of about 200 MPa). In the second case, more flexible resin systems can be produced by blending in an elastomer with the polyethylene during a reactive extrusion step. However, special extrusion equipment (e.g., silane dosing equipment, designed barrier screw, etc.) is needed to carry out the radical grafting process successfully. Additionally, elastomers that degrade or scission in the presence of peroxide or other free-radical sources cannot be used. Moreover, existing moisture-cured resins tend to become brittle or stiff at low temperatures, such as can be encountered in outdoor use during the winter.

Thus there is still a need for a simple process to prepare silane crosslinkable polyolefins with improved flexibility which still meet tensile, elongation and cure state target properties for low voltage insulation, particularly at low temperatures.

BRIEF SUMMARY OF THE INVENTION

In one embodiment, the invention is a composition comprising: (1) at least about 60 weight percent, based on the total weight of polymer resins, of at least one silane crosslinkable polyolefin polymer resin; and, (2) up to about 40 weight percent, based on the total weight of polymers, of at least one polyolefin polymer elastomer resin, wherein the polyolefin polymer elastomer resin has a density of less than or equal to about 0.89 g/cm$^3$ and a melt index, $I_2$, of less than about 50 g/10 min and which has been prepared using at least one metallocene catalyst.

In another embodiment, the invention is a cable comprising: (1) a conductive core; and, (2) a layer of an insulating material outside of the conductive core, wherein the insulating material comprises a composition comprising (a) at least about 60 weight percent, based on the total weight of polymer resins, of at least one silane crosslinkable polyolefin polymer resin; and, (b) up to about 40 weight percent, based on the total weight of polymers, of at least one polyolefin polymer elastomer resin, wherein the polyolefin polymer elastomer resin has a density of less than or equal to about 0.89 g/cm$^3$ and a melt index, $I_2$, of less than about 50 g 10 min. and which has been prepared using at least one metallocene catalyst.

DETAILED DESCRIPTION THE INVENTION

Surprisingly, simply blending in up to 40% of an unmodified metallocene catalyzed polyolefin elastomer into a silane-functionalized polymer, followed by moisture curing, results in a slime cured blend with greatly improved flexibility (flexural modulus approx. 100 MPa) which meets hot set, tensile and elongation targets for low voltage insulation. This is surprising as the added elastomer contains no crosslinkable or functional groups which can aid network formation.

Moisture curable polymers with silane functional groups are well-known in the field. Such polymers can be made either by copolymerization with a vinyl silane monomer or by one of many methods for grafting a silane-containing molecule to the backbone of a polymer chain. Examples of such techniques are disclosed in U.S. Pat. Nos. 3,646,155; 6,420,485; 6,331,597; 3,225,018; or 4,574,133, all of which are incorporated herein by reference. Polymers with silane functional groups are also commercially available, for example, SI-LINK™ ethylene-vinyltrimethoxysilane copolymers available from Dow Chemical Co. or VISICO™ polymers from Borealis The silane-functionalized polymers usable in the present invention may be cured by contact with, or exposure to, water (moisture), preferably in the presence of a condensation catalyst (also called "moisture-cure" catalyst herein). Suitable catalysts include metal carboxylates, such as dibutyltin dilaurate, stannous octoate, stannous acetate, lead naphthenate and zinc octoate; organic metal compounds, such as titanium esters and chelates such as tetrabutyl titanate; organic bases, such as ethylamine, hexylamine and piperidine; and acids, such as mineral acids and fatty acids. Ambient or accelerated cure systems typically use fast acting condensation catalysts, such as aromatic sulphonic acids. Preferred catalysts are organic tin compounds such as dibutyltin dilaurate, dibutyl dimethoxy tin, dibutyltin bis(2,4-pentanedionate), stannous octoate, and aromatic sulphonic acids. Such moisture-cure condensation catalysts and catalyst systems are readily commercially available. Examples of suitable commercial catalysts in masterbatch form include, without limitation, DFDB 5480NT (a tin catalyst system), DFDA 5488NT (a fast ambient cure catalyst masterbatch) from DOW Plastics, or the Borealis AMBICAT™ system LE 4476.

The amount of catalyst sufficient to cure the silane-functionalized polymer will generally depend on the specific type selected but will preferably range from about 0.01 to 0.1 parts by weight per 100 parts by weight of the silane polymer. If added in the form of a commercial polymer masterbatch as above the catalyst masterbatch is added in the ratio 5 parts to 95 parts of silane copolymer.

The moisture cure may be done in a steam chamber, a continuous steam vulcanization tunnel, a hot water sauna, or simply by exposure to air (ambient cure) or any other convenient means. Prior to moisture curing, the silane-functionalized polymers are blended with low density metallocene polyolefin elastomers, a particular combination which leads to a crosslinked flexible compound. Typically, the polyolefin elastomers are ethylene copolymers. These polyolefin elastomers should have a density of less than or equal to about 0.89 g/cm$^3$, more preferably less than or equal to about 0.885 g/cm$^3$. All polymer density values in the specification and claims are as measured by ASTM D-792. Preferably, the polyolefin elastomers have a melt index, $I_2$, of less than about 50 g/10 min, more preferably between about 1 and about 40/10 min, and more preferably, of between about 1 to about 30/10 min. All melt indexes in the specification and claims are as measured by ASTM D-1238, Condition 190 C/2.16 kg.

The polyolefin elastomer preferably composes at least about 20, more preferably at least about 30, most preferably about 40 weight percent of the total weigh of polymer resins in the composition The polyolefin elastomers are prepared with at least one metallocene catalyst. The elastomer resin may also be prepared with more than one metallocene catalyst or may be a blend of multiple elastomer resins prepared with different metallocene catalysts. In some embodiments, the elastomer is a substantially linear ethylene polymer (SLEP). SLEPs and other metallocene catalyzed elastomers are known in the art, for example, U.S. Pat. No. 5,272,236 incorporated herein by reference. These elastomer resins are also commercially available, for example, as ENGAGE™ elastomer resins available from Dow Chemical Co. or EXACT™ polymers from Exxon or TAFMER™ polymers from Mitsui Chemicals.

In some embodiments, the polyolefin elastomer should be incompatible (i.e., immisicible) with the silane-functionalized polymer. This is in contrast to prior art systems that either rely on a radical grafting process or cover blends of silane copolymer with crystalline polyethylenes which are mutually compatible. The inventors speculate that the incompatibility of the silane copolymer and the polyolefin elastomer allows the silane copolymer to still form a crosslinked network even in the presence of high (up to 40% or so) amounts of the elastomer. Consequently, the final blend has excellent cure performance, mechanicals and flexibility.

The composition can contain other flame retardants and fillers including metal hydrates (such as aluminum trihydroxide and magnesium hydroxide), talc, calcium carbonate, organoclay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures thereof. The fillers may contain various surface coatings or treatments, such as silanes, fatty acids, and the like. Halogenated organic compounds including halogenated hydrocarbons such as chlorinated paraffin, halogenated aromatic compounds such as pentabromotoluene, decabromodiphenyl oxide, decabromodiphenyl ethane, ethylene-bis(tetrabromophthalimide), dechlorane plus, and other halogen-containing flame retardants. One skilled in the art would recognize and select the appropriate halogen agent depending on the desired performance of the composition. The composition can further comprise various other additives. Peroxides and free-radical initiators can be added for crosslinking the resin. Additionally, pigments and fillers may be added as desired.

The composition can contain other additives such as, for example, antioxidants (e.g., hindered phenols such as, for example, IRGANOX™ 1010 a registered trademark of CibaSpecialty Chemicals), phosphites (e.g., IRGAFOS™ 168 a registered trademark of CibaSpecialty Chemicals), U.V. stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), colorants or pigments to the extent that they do not interfere with desired physical or mechanical properties of the compositions of the present invention, and other flame retardant additives. The above additives are employed in functionally equivalent amounts known to those skilled in the art, generally in amounts of up to about 65 percent by weight, based upon the total weight of the composition.

The composition of the invention can be made by simply dry blending or melt blending the individual components and additives. For convenience, certain of the ingredients may be premixed, such as by melt processing, into master batches. Such master batches are useful in aiding uniform dispersion of the ingredients and minimizing the number of components that need to be blended at the end-user's facilities.

The compositions of the present invention can be processed to fabricated articles by any suitable means known in the art. For example, the compositions can be processed to films or sheets or to one or more layers of a multilayered structure by know processes, such as calendering, blowing, casting or (co-)extrusion processes. Injection molded, compression molded, extruded or blow molded parts can also be prepared from the compositions of the present invention. Alternatively, the compositions can be processed to foams or fibers or extruded into wire and cable coatings such as jacketing and insulation.

EXAMPLES

Twelve samples (Ex. 1-12) of elastomer resins and silane crosslinkable polymer resins were made with the formulations shown in Table 1. A comparative sample (C.S.A.) of just the silane crosslinkable polymer resin without the elastomer resin was also prepared as shown in Table 1. The samples were prepared by using a small internal mixer to blend the 3 components at 160° C. for a total of 10 minutes. The blended composites were then immediately pressed into a 2 mm thick plate.

Curing and cure rate procedure: The plate is placed immediately in a water bath at 60 C and cure time noted. Hot set performance at 200° C. with 0.2 MPa weight as per specification is measured as a function of cure time in the water bath.

Test procedures: On the fully cured samples (i.e., when hot set is at the minimum) tensile and flexural modulus properties are measured. Results are summarized in Table 2 below.

TABLE 1

Sample Formulations (weight percent)

| Sample No. | Engage 7256 | Engage 8100 | DFDB 5451 NT | DFDA 5488 NT | Versify 2300 | D9100 | Engage 8411 |
|---|---|---|---|---|---|---|---|
| C.S.A. | 0 | 0 | 95.0 | 5.0 | 0 | 0 | 0 |
| Ex. 1 | 10 | 0 | 85.5 | 4.5 | 0 | 0 | 0 |
| Ex. 2 | 20 | 0 | 76.0 | 4.0 | 0 | 0 | 0 |
| Ex. 3 | 30 | 0 | 66.5 | 3.5 | 0 | 0 | 0 |
| Ex. 4 | 40 | 0 | 57.0 | 3.0 | 0 | 0 | 0 |
| Ex. 4a | 40 | 0 | 55.0 | 5.0 | 0 | 0 | 0 |
| Ex. 5 | 0 | 10 | 85.5 | 4.5 | 0 | 0 | 0 |
| Ex. 6 | 0 | 20 | 76.0 | 4.0 | 0 | 0 | 0 |
| Ex. 7 | 0 | 30 | 66.5 | 3.5 | 0 | 0 | 0 |
| Ex. 8 | 0 | 40 | 57.0 | 3.0 | 0 | 0 | 0 |

TABLE 1-continued

Sample Formulations (weight percent)

| Sample No. | Engage 7256 | Engage 8100 | DFDB 5451 NT | DFDA 5488 NT | Versify 2300 | D9100 | Engage 8411 |
|---|---|---|---|---|---|---|---|
| Ex. 9  | 0 | 0 | 85.5 | 4.5 | 10.0 | 0    | 0    |
| Ex. 10 | 0 | 0 | 76.0 | 4.0 | 20.0 | 0    | 0    |
| Ex. 11 | 0 | 0 | 66.5 | 3.5 | 30.0 | 0    | 0    |
| Ex. 12 | 0 | 0 | 57.0 | 3.0 | 40.0 | 0    | 0    |
| Ex. 13 | 0 | 0 | 85.5 | 4.5 | 0    | 10.0 | 0    |
| Ex. 14 | 0 | 0 | 66.5 | 3.5 | 0    | 30.0 | 0    |
| Ex. 15 | 0 | 0 | 85.5 | 4.5 | 0    | 0    | 10.0 |
| Ex. 16 | 0 | 0 | 66.5 | 3.5 | 0    | 0    | 30.0 |

Engage ™ 7256 0.885 g/cm$^3$, I$_2$ = 2.0 g/10 min
Engage ™ 8100 0.870 g/cm$^3$, I$_2$ = 1.0/g/10 min
Versify ™ 2300 propylene-ethylene copolymer MFR = 2; 0.866 g/cm$^3$, Shore A 88, Flex Modulus 32(MPa)
DFDB 5451 NT Si-Link ™ ethylene-vinyl trimethoxy silane copolymer, 0.93 g/cm$^3$ I$_2$ = 1.5 g/10 min
DFDB 5488 NT ambient or accelerated cure natural LDPE catalyst master batch for crosslinking moisture curable polymers, available from Dow Chemical
D9100 0.877 g/cm$^3$, I$_2$ = 1 g/10 min
Engage ™ 8411 0.880 g/cm$^3$, I$_2$ = 18 g/10 min

TABLE 2

Test Results

| Sample No. | % Elastomer | Hot Set Time to 175% Elongation (hrs) | Hot Set End point (%) | Tensile Strength (MPa) | Elong. @ Break (%) | Flexural Modulus at −30 C./ 25 C. MPa |
|---|---|---|---|---|---|---|
| C.S.A. | 0 | 2 | 30 | 19.3 | 340 | 1592/190 |
| Ex. 1 | 10% 7256 | 2 | 35 | 16.9 | 330 | 1250/165 |
| Ex. 2 | 20% 7256 | 2.6 | 55 | 18.6 | 390 | 1050/140 |
| Ex. 3 | 30% 7256 | 3.4 | 85 | 18.3 | 440 | 850/120 |
| Ex. 4 | 40% 7256 | 10 | 110 | 16 | 450 | 690/105 |
| Ex. 4a | 40% 7256 + high cat level | 4.9 | 110 | 16.9 | 520 | 770/120 |
| Ex. 5 | 10% 8100 | 2.1 | 35 | 20.3 | 400 | 1125/170 |
| Ex. 6 | 20% 8100 | 2 | 55 | 18.8 | 430 | 960/150 |
| Ex. 7 | 30% 8100 | 2.8 | 85 | 20 | 510 | 735/120 |
| Ex. 8 | 40% 8100 | 5.2 | 125 | 16.4 | 500 | 595/90 |
| Ex. 9 | 10% Versify 2300 | 2.06 | 42.5 | 17.6 | 350 | 1480/165 |
| Ex. 10 | 20% Versify 2300 | 3.05 | 55 | 15.3 | 350 | 1350/140 |
| Ex. 11 | 30% Versify 2300 | 5.1 | 105 | 12.8 | 360 | 1200/120 |
| Ex. 12 | 40% Versify 2300 | 36 | 130 | 10.2 | 400 | 895/90 |
| Ex. 13 | 10% D9100.00 | 3 | 50 | 19.5 | 380 | NM/200 |
| Ex. 14 | 30% D9100.00 | No cure | molten | 18.1 | 790 | NM/140 |
| Ex. 15 | 10% Engage 8411 | 1.9 | 50 | 19.9 | 385 | 1200/195 |
| Ex. 16 | 30% Engage 8411 | 5.5 | 80 | 17.6 | 460 | 650/135 |

The results show that, even at 40% elastomer, the inventive composition with ethylene elastomers provide at least about 83% of the tensile strength of the base silane crosslinkable resin (compare Ex. 4 and Ex. 8 with C.S.A.). Furthermore, the addition of the ethylene elastomers decreased the flexural modulus compared to the base silane crosslinkable resin (i.e. Improved flexibility). Comparing Ex. 4 and Ex. 8 with C.S.A. shows flexural moduli, at 25 C, that are 55% and 47% of the control resin, respectively. An even larger improvement is shown at −30 C, with respective moduli of 43% and 37% of the control resin modulus. The addition of the polypropylene elastomer resin showed the same trends of maintaining tensile strength and decreasing flexural modulus, but to a lesser extent than the polyolefin elastomer resins. Whereas the decrease in flexural modulus could be anticipated, the ability of the silane system to maintain to a large extent cure rate, hot set end point and mechanical performance is surprising.

As demonstrated by Examples 9-14, not all polyolefin elastomers work equally well, or even work at all, in the inventive compositions and methods. However, the applicants believe that one skilled in the art use routine experimentation to select appropriate elastomers based on guidelines and working examples provided.

What is claimed is:

1. A composition comprising:
   at least about 60 weight percent, based on the total weight of polymer resins, of at least one silane crosslinkable polyolefin polymer resin; and,
   at least one substantially linear ethylene polymer elastomer resin present in an amount of about 20 weight percent to about 40 weight percent, based on the total weight of polymers, wherein the polymer elastomer resin has a density of less than or equal to about 0.89 g/cm$^3$ and a melt index, $I_2$, of less than about 50 g/10 min.;
   wherein the composition has a flexural modulus at −30° C. between 595 and 1050 MPa.

2. The composition of claim 1 wherein the silane crosslinkable polyolefin polymer is a copolymer of ethylene with a vinyl silane comonomer.

3. The composition of claim 1 wherein the silane crosslinkable polyolefin polymer is a copolymer of ethylene-vinyltrimethoxysilane.

4. The composition of claim 1 wherein the polymer elastomer resin is present in amount at least 30 weight percent based on the total weight of the polymers.

5. The composition of claim 1 wherein the polymer elastomer resin is present in an amount of about 40 weight percent based on the total weight of the polymers.

6. The composition of claim 1 wherein the polymer elastomer resin has a density of less than or equal to about 0.885 g/cm$^3$.

7. The composition of claim 1 wherein the polymer elastomer resin has a melt index, $I_2$, of between about 1 to about 40 g/10 min.

8. The composition of claim 1 wherein the polymer elastomer resin has a melt index, $I_2$, of between about 1 to about 30/10 min.

9. The composition of claim 1 further comprising at least one of fillers, flame-retardants, pigments, antioxidants and catalysts.

10. A cable comprising:
    a conductive core; and,
    a layer of an insulating material outside of the conductive core, wherein the insulating material comprises a composition comprising at least about 60 weight percent, based on the total weight of polymer resins, of at least one silane crosslinkable polyolefin polymer resin; and, of about 20 weight percent to about 40 weight percent, based on the total weight of polymers, of at least one substantially linear ethylene polymer elastomer resin, wherein the polymer elastomer resin has a density of less than or equal to about 0.89 g/cm$^3$ and a melt index, $I_2$, of less than about 50 g/10 min.;
    wherein the composition has a flexural modulus at −30° C. between 595 and 1050 MPa.

11. The cable of claim 10 wherein the silane crosslinkable polyolefin polymer is a copolymer of ethylene with a vinyl silane comonomer.

12. The cable of claim 10 wherein the composition silane crosslinkable polyolefin polymer is ethylene-vinyltrimethoxysilane.

13. The cable of claim 10 wherein the composition polymer elastomer resin is present in amount of at least 20 weight percent based on the total weight of the polymers.

14. The cable of claim 10 wherein the composition polymer elastomer resin is present in amount at least 30 weight percent based on the total weight of the polymers.

15. The cable of claim 10 wherein the composition polymer elastomer resin is present in an amount of about 40 weight percent based on the total weight of the polymers.

16. The cable of claim 10 wherein the composition polymer elastomer resin has a density of less than or equal to about 0.885 g/cm$^3$.

17. The cable of claim 10 wherein the composition polymer elastomer resin has a melt index, $I_2$, of between about 1 to about 40 g/10 min.

18. The cable of claim 10 wherein the composition polymer elastomer resin has a melt index, $I_2$, of between about 1 to about 30 g/10 min.

19. The cable of claim 10 wherein the composition further comprising at least one of fillers, flame-retardants, pigments, antioxidants and catalysts.

* * * * *